United States Patent [19]

Kaufmann

[11] Patent Number: 4,509,920
[45] Date of Patent: Apr. 9, 1985

[54] EDUCATIONAL TOY FOR TEACHING ALPHANUMERIC SEQUENCES

[76] Inventor: Robert Kaufmann, 84-11 168th Pl., Jamaica, N.Y. 11432

[21] Appl. No.: 607,814

[22] Filed: May 7, 1984

[51] Int. Cl.³ ............................................... G09B 1/06
[52] U.S. Cl. .................................. 434/159; 273/157 R; 434/191; 434/258; 446/100; 446/117
[58] Field of Search .......................... 446/99, 100, 117; 434/159, 172, 191, 258, 259; 273/157 R

[56] References Cited

U.S. PATENT DOCUMENTS

| D. 18,592 | 9/1888 | Volk | 434/159 X |
|---|---|---|---|
| 702,615 | 6/1902 | Barden | 273/157 R |
| 1,329,850 | 2/1920 | Pye | 434/258 X |
| 2,399,566 | 4/1946 | Owen | 446/117 X |
| 2,475,306 | 7/1949 | Beder | 446/117 X |
| 2,839,842 | 6/1958 | Keyko | 434/259 |
| 3,350,811 | 11/1967 | Bender | 446/117 |
| 3,564,757 | 2/1971 | Fields | 446/117 |
| 3,715,810 | 2/1973 | Coates | 434/172 X |
| 4,211,029 | 7/1980 | Cretin | 446/117 |

*Primary Examiner*—William H. Grieb
*Attorney, Agent, or Firm*—Daniel Jay Tick

[57] ABSTRACT

A support device has a rod-like support member and a base for maintaining the support member in upright position. A guide device extends along the length of the support member, which has a free top end at its farthest distance from the base. Each of a plurality of body members has an axial bore formed therethrough whereby each of the body members is removably slidably mounted on the support member. Each of the body members has a directing device for cooperating with the guide device in a manner whereby each of the body members rotates about the axis of the support member in a first direction of rotation when it slides on the support member toward the base and in a second opposite direction of rotation, when it slides on the support member away from the base thereby providing variable spiral motion of the body members. A top member has an axial bore formed therein whereby the top member is removably slidably mounted on the support member. The top member has a directing device for cooperating with the guide device at the top end of the support member in a manner whereby the top member rotates about the axis of the support member in the first direction of rotation when it slides on the support member toward the base and in the second direction of rotation when it slides on the support member away from the base thereby providing variable spiral motion of the top member.

17 Claims, 11 Drawing Figures

4,509,920

EDUCATIONAL TOY FOR TEACHING ALPHANUMERIC SEQUENCES

BACKGROUND OF THE INVENTION

The present invention relates to a toy. More particularly, the invention relates to a toy for young children from toddlers to three or four years old.

There are many toys for young children which combine teaching and strengthening various skills of the child and exercising his or her mental prowess as well as amusing and interesting the child. In the present world, it is essential that children be trained to sharpen their manual and mental skills, or at least awaken such skills, at a very early age. This is due to the need for enlightened people to continually develop knowledge, during their lifetimes, as technology develops. Those who do not remain abreast of, and utilize, the developing technologies fall behind. A child must start training at an early age in order to develop a solid learning base.

The principal object of the invention is to provide a toy for the amusement and mental and physical training of very young children.

An object of the invention is to provide a toy for the amusement and interest of young children, which is safe to use and will not harm a child.

Another object of the invention is to provide a toy of simple and safe structure for the mental and manual training of young children.

Still another object of the invention is to provide a toy of simple structure, which is inexpensive in manufacture, safe in use, of amusement and interest to children from toddlers to four years of age, and which provides invaluable training in manual and intellectual skills.

Yet another object of the invention is to provide a toy for training very young children in manual skills and for teaching them numbers and/or letters of the alphabet and alphanumeric sequences.

Another object of the invention is to provide a toy which, with simple modifications, serves as a puzzle for older children and adults.

BRIEF SUMMARY OF THE INVENTION

In accordance with the invention, a toy comprises a support device having a rod-like support member and a base for maintaining the support member in substantially upright position. The support member has an axis, axial length, a guide device extending along the length and a free top end at its farthest distance from the base. Each of a plurality of body members has an axial bore formed therethrough whereby each of the body members is removably slidably mounted on the support member and each has a directing device for cooperating with the guide device in a manner whereby each of the body members rotates about the axis of the support member in a first direction of rotation when it slides on the support member toward the base and in a second direction of rotation, opposite the first direction, when it slides on the support member away from the base thereby providing variable motion of the body members to interest young children playing with the toy. A top member has an axial bore formed therein whereby the top member is removably slidably mounted on the support member and has a directing device for cooperating with the guide device at the top end of the support member in a manner whereby the top member rotates about the axis of the support member in the first direction of rotation when it slides on the support member toward the base and in the second direction of rotation when it slides on the support member away from the base thereby providing variable motion of the top member to interest young children playing with the toy.

A retaining device releasably retains the top member in position on the support member.

Position indicating devices are on the body members and cooperate with the top member for indicating the proper position of each of the body and top members relative to the others thereof.

The guide device of the support member comprises a spiral groove formed in the surface thereof and extending along the length of the support member. The directing device of each of the body members and the top member comprises a projection extending substantially radially into the axial bore thereof and extending into the groove when the member is on the support member.

The body members and the top member form a predetermined configuration when each of the body and top members is in its proper position relative to the others of the members.

The retaining device comprises a substantially radially extending anchor bore in the support member at the top end thereof and extending inwardly from the surface of the support member, a retaining bore formed through the top member and aligned with the anchor bore when the top member is in its proper position, and a peg-like member for passing through the retaining bore and extending into the anchor bore thereby retaining the top member in position.

The position indicating devices comprise an alphanumeric button on each of the body members. Each of the alphanumeric buttons indicates a different number or letter and the numbers or letters are in numerical or alphabetic sequence when the body members are in their proper positions.

Position indicating devices are provided on the body members and on the top member for indicating the proper position of each of the body and top members relative to the others thereof. The bolt has a large button-type head with a number or letter indicated thereon. The position indicating devices comprise an alphanumeric button on each of the body members and on the head of the bolt. Each of the alphanumeric buttons and the head indicates a different number or letter and the numbers or letters are in numerical or alphabetic sequence when the body members and top member are in their proper positions.

In accordance with the invention, a toy comprises a rod-like support member and a base for maintaining the support member in substantially vertical position. The support member has an axis, a guide device extending along the length and a free top end at its farthest distance from the base. Each of a plurality of body members has an axial bore formed therethrough whereby each of the body members is removably slidably mounted on the support member and each has a directing device for cooperating with the guide device in a manner whereby each of the body members rotates about the axis of the support member in a first direction of rotation when it slides on the support member toward the base and in a second direction of rotation, opposite the first direction, when it slides on the support member away from the base thereby providing variable spiral motion of the body members to interest young children playing with the toy. A head member has an axial bore formed therein whereby the head member is removably slidably mounted on the support member and has a directing device for cooperating with the guide device at the top end of the support member in a manner whereby the head member rotates about the axis of the support member in the first direction of rotation when it slides on the support member toward the base and in the second direction of rotation when it slides on the support member away from the base thereby providing variable spiral motion of the head member to interest young children playing with the toy.

Each of the body members is of an irregular generally cylindrical configuration and the body members and the head member form a predetermined configuration when each of the body and head members is in its proper position relative to the others of the members.

A retaining device releasably retains the head member in position on the support member. Position indicating devices on the surface of each of the body members and on the retaining device indicate the proper position of each of the body and head members relative to the others thereof.

The guide device of the support member comprises a spiral groove formed in the surface thereof and extending along the length of the support member. The directing device of each of the body members and the head member comprises a projection extending substantially radially into the axial bore thereof and extending into the groove when the member is on the support member.

The body members in their proper positions form the body of a doll-like configuration and the head member in its proper position forms the head of the configuration.

The retaining device comprises a substantially radially extending internally threaded anchor bore in the support member at the top end thereof and extending inwardly from the surface of the support member. A retaining bore is formed through the head member and aligned with the anchor bore when the head member is in its proper position. A bolt passes through the retaining bore and threadedly couples in the anchor bore thereby retaining the head member in position.

The position indicating devices comprise a number button on each of the body members. Each of the number bottons indicates a different number and the numbers are in numerical sequence when the body members are in their proper positions.

The peg-like member has a large button-type head with a number thereon. The position indicating devices comprise a number botton on each of the body members and on the head of the peg-like member. Each of the number buttons and the head indicates a different number and the numbers are in numerical sequence when the body members and head members are in their proper positions.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
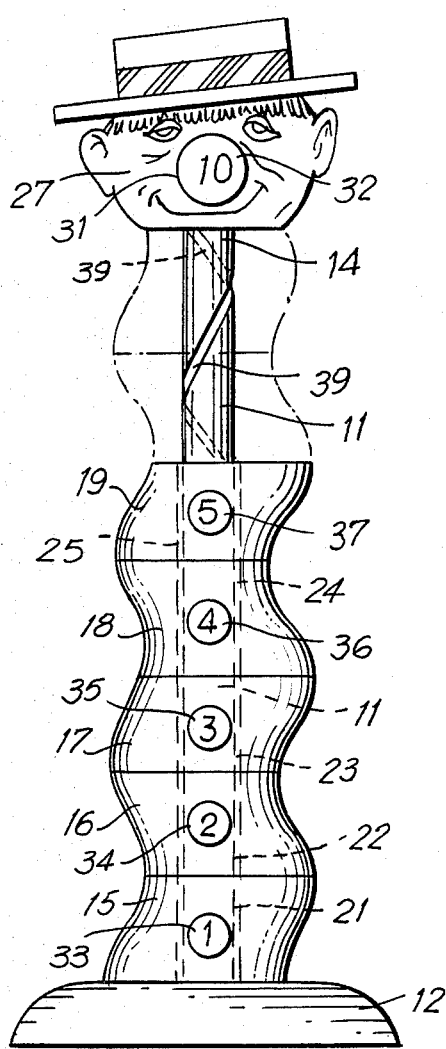
FIG. 1 is a front view of an embodiment of the toy of the invention, in partly assembled condition.

Although any suitable configuration, consisting of a plurality of body members and a top member of any suitable configuration may be utilized as the toy of the invention, a single configuration is illustrated in the drawings and is described as the invention. Any animate or inanimate object or thing may be represented by the toy of the invention, just as the components of toy may consist of any suitable material such as, for example, polished wood, plastic, rubber, or the like. Furthermore, any suitable color scheme may be ulilized to enhance the attractiveness of the toy to children.

The body members may be of the same color, different colors, or follow a specific color pattern such as, for example, alternate red and white. The top member may represent a human head or an animal head with any kind of features and may also represent the top of an inanimate object. Similarly, the base may be of any desired configuration; its primary function being to support the support member in the desired manner.

The toy of the invention comprises support means having a rod-like support member 11 (FIGS. 1 and 3) and a base 12 (FIG. 1) for maintaining said support member in upright, and preferably vertical position, as shown in FIG. 1. The support member 11 has an axis 13 (FIG. 3), an axial length extending from one of its ends to the other of its ends, guide means extending along its axial length and a free top end 14 (FIGS. 1 and 3) at its farthest distance from the base 12.

A plurality of body members, of which body members 15, 16, 17, 18 and 19, are shown in FIG. 1, and of which an additional body member 20 is shown in FIGS. 6 to 9, are provided. Any suitable number of body members may be utilized, dependent upon the axial length of the support member 11 and the axial dimension of each of the body members. Each body member 15 to 20, and so on, has an axial bore formed therethrough whereby each of the body members is removably slidably mounted on the support member 11. Thus, the body members 15 to 20 have axial bores 21, 22, 23, 24, 25 and 26, respectively, as shown in FIGS. 1 and 6 to 9.

Each of the body members 15 to 20, and so on, has directing means for cooperating with the guide means in a manner whereby each of the body members rotates about the axis 13 of the support member 11 in a first direction of rotation such as, for example, clockwise, when it slides on said support member toward the base 12 and in a second direction of rotation, opposite said first direction, such as, for example, counterclockwise, when it slides on said support member away from said base. The cooperation of the guide means and the directing means thus provides variable spiral motion to the body members 15 to 20, and so on, to interest young children playing with the toy.

A top or head member 27 (FIGS. 1 and 2) has an axial bore 28 formed therein (FIG. 2) whereby said top or head member is removably slidably mounted on the support member 11. The top member 27 has directing means for cooperating with the guide means at the top end 14 of the support member 11 in a manner whereby said top member rotates about the axis 13 of said support member in the first direction of rotation when it slides on said support member toward the base 12 and in said second direction of rotation when it slides on said support member away from said base thereby providing variable spiral motion of said top member to interest young children playing with the toy.

Although the body members 15 to 20, and so on, may be of any desirable configuration, in the illustrated embodiment of the invention, each of said body members is of an irregular generally cylindrical configuration. The body members 15 to 20, and so on, and the head member 27 form a predetermined configuration of a doll in the illustrated embodiment, when each of the body members and the head member is in its proper position relative to the others of the members.

Figure 2:
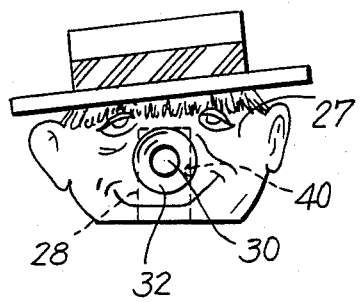
FIG. 2 is a front view of the top member of the embodiment of FIG. 1.
Figure 3:
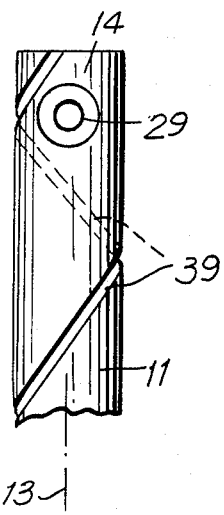
FIG. 3 is a view, on an enlarged scale, of part of the support member of the embodiment of FIG. 1.
Figure 4:
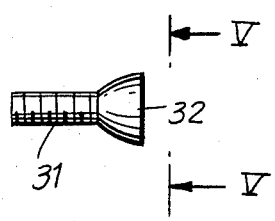
FIG. 4 is a side view of an embodiment of the peg-like member of the toy of the invention.
Figure 5:
FIG. 5 is a view, taken along the lines V—V, of FIG. 4.
Figure 6:
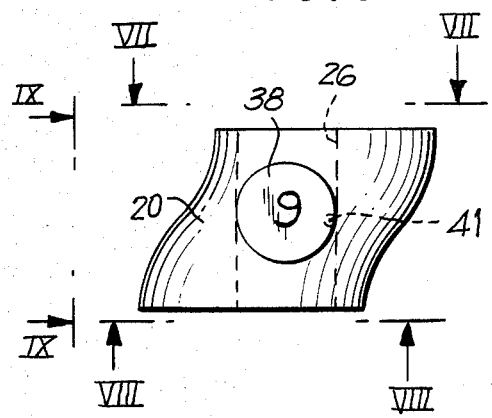
FIG. 6 is a front view of the body member of the embodiment of FIG. 1, on an enlarged scale.
Figure 7:
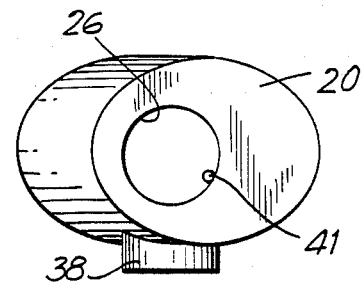
FIG. 7 is a top view, taken along the lines VII—VII, of FIG. 6.
Figure 8:
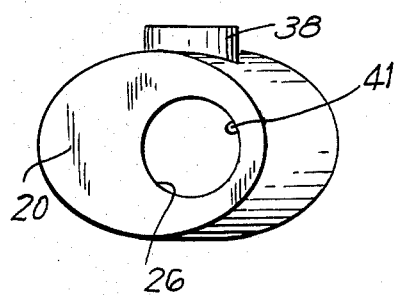
FIG. 8 is a bottom view, taken along the lines VIII—VIII, of FIG. 6.
Figure 9:
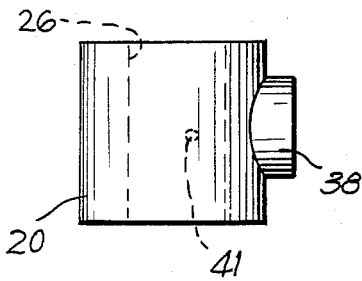
FIG. 9 is a side view, taken along the lines IX—IX, of FIG. 6.

Retaining means releasably retains the top or head member 27 in position on the support member 11. The retaining means comprises a substantially radially extending internally threaded anchor bore 29 (FIG. 3) in the support member 11 at the top end 14 thereof and extending inwardly from the surface of said support member, as shown in FIG. 3. A retaining bore 30 (FIG. 2) is formed through the head member 27 and is aligned with the anchor bore 29 when said head member is in its proper position. A bolt 31 (FIGS. 1 and 4) passes through the retaining bore 30 and threadedly couples in the anchor bore 29 thereby retaining the head member 27 in position, as shown in FIG. 1. The internal and external threading may be dispensed with and the bolt 31 may thus be replaced by a simple peg.

In order to enhance the intellectual or mental skills of a child playing with the toy of the invention, and, more particularly, to teach the child numbers, the letters of the alphabet and numerical and alphabetic sequences, position indicating means are provided on the body members 15 to 20, and so on, and on the retaining member 31 for indicating the proper position of each of said body members and the head member 27 relative to the others thereof. Thus, for example, the position indicating means comprise a number button on each of the body members 15 to 20, and so on, and the bolt 31 has a large button-type head 32 (FIGS. 1, 2 and 4) with a number thereon. Thus, the body members 15 to 20 have number buttons 33, 34, 35, 36, 37 and 38, resepctively, as shown in FIGS. 1 and 6 to 9. The number buttons 33 to 37 may thus have the numbers "1", "2", "3", "4" and "5" and the number button 38 may have the number "9" thereon, for example, if there are nine body members. In such case, and, as illustrated, the button-type head 32 of the bolt 31 has the number "10" thereon, as shown in FIG. 1.

The number buttons 33 to 37 may, of course, have the letters "A", "B", "C", "D" and "E" thereon, respectively. In this case, the number button 38 will have the letter "I" thereon and the head 32 will have the letter "J" thereon. In learning to position the body members 15 to 20, and so on, in proper order, the child learns the numbers and/or letters in their proper sequence. If the numbers or letters are omitted, the toy may serve as an adult puzzle.

The number buttons may be removably mounted on the body members. Furthermore, the number buttons may be blank, so that a child's name or any suitable word may be spelled out by erasably writing its letters on said number buttons. Each of the body members may be inobtrusively marked on a normally unseen surface thereof to indicate their normal sequence.

The guide means of the support member 11 comprises a spiral groove 39 (FIGS. 1 and 3) formed in the surface of said support member and extending along the axial length of said support member. The groove 39 may be of any suitable configuration such as, for example, a spiral interrupted by a linear part, a spiral in one direction or in the opposite direction and a spiral in the one direction joined to a spiral in the opposite direction.

Figure 10:
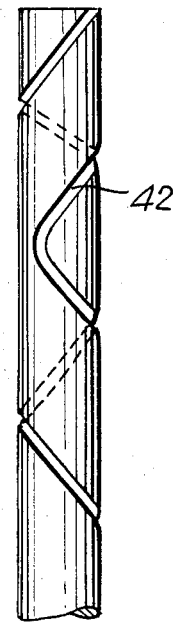
FIG. 10 is a view, on an enlarged scale, of part of another embodiment of the support member of the toy of the invention.
Figure 11:
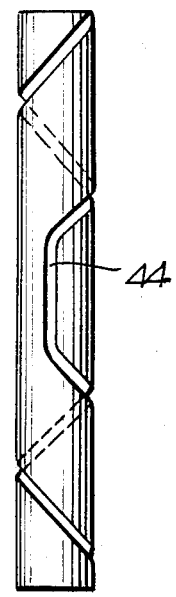
FIG. 11 is a view, on an enlarged scale, of part of still another embodiment of the support member of the toy of the invention.

Thus, as shown in FIG. 10, the groove 42 of the guide means of the support member is a spiral which turns in a direction opposite that of the spiral groove 39 of the embodiment of FIG. 1, and, as shown in FIG. 11, the groove 43 of the guide means of the support member is a spiral interrupted by a linear part 44.

The directing means of each of the body members 15 to 20, and so on, and the head member 27 comprises a projection extending substantially radially into the axial bore thereof and extending into the groove 39 when the body member and head member are on said support member. In order to enhance the clarity of illustration, the projections of the body members 15 to 19 are not shown in the drawings. However, the projection 40 of the head member 27 is shown in FIG. 2 and the projection 41 of the body member 20 is shown in FIGS. 6 to 9.

While the invention has been described by means of a specific example and in a specific embodiment, I do not wish to be limited thereto, for obvious modifications will occur to those skilled in the art without departing from the spirit and scope of the invention.

I claim:

1. A toy, comprising
support means having a rod-like support member and base means for maintaining said support member in substantially upright position, said support member having an axis, axial length, guide means extending along said length and a free top end at its farthest distance from said base means;
a plurality of body members each having an axial bore formed therethrough whereby each of said body members is removably slidably mounted on said support member and each having directing means for cooperating with said guide means in a manner whereby each of said body members rotates about the axis of said support member in a first direction of rotation when it slides on said support member toward said base means and in a second direction of rotation, opposite said first direction, when it slides on said support member away from said base means thereby providing variable motion of said body members to interest young children playing with said toy; and
a top member having an axial bore formed therein whereby said top member is removably slidably mounted on said support member and having directing means for cooperating with said guide means at said top end of said support member in a manner whereby said top member rotates about the axis of said support member in said first direction of rotation when it slides on said support member toward said base means and in said second direction of rotation when it slides on said support member away from said base means thereby providing variable motion of said top member to interest young children playing with said toy.

2. A toy as claimed in claim 1, further comprising retaining means for releasably retaining said top member in position on said support member.

3. A toy as claimed in claim 1, further comprising position indicating means on said body members and cooperating with said top member for indicating the proper position of each of said body and top members relative to the others thereof.

4. A toy as claimed in claim 1, wherein said guide means of said support member comprises a spiral groove formed in the surface thereof and extending along said length of said support member and wherein said directing means of each of said body members and said top member comprises a projection extending substantially radially into the axial bore thereof and extending into said groove when said member is on said support member.

5. A toy as claimed in claim 1, wherein said body members and said top member form a predetermined configuration when each of said body and top members is in its proper position relative to the others of said members.

6. A toy as claimed in claim 2, wherein said retaining means comprises a substantially radially extending anchor bore in said support member at said top end thereof and extending inwardly from the surface of said support member, a retaining bore formed through said top member and aligned with said anchor bore when said top member is in its proper position, and a peg-like member for passing through said retaining bore and extending into said anchor bore thereby retaining said top member in position.

7. A toy as claimed in claim 3, wherein said position indicating means comprise a button on each of said body members, each of said buttons having a surface on which any desired number or letter may be erasably written whereby when said body members are in their proper positions letters written on said buttons spell out a desired word.

8. A toy as claimed in claim 7, wherein each of said buttons is an alphanumeric button indicating a different number or letter and said numbers or letters are in numerical or alphabetic sequence when said body members are in their proper positions.

9. A toy as claimed in claim 8, further comprising position indicating means on said body members and on said top member for indicating the proper position of each of said body and top members relative to the others thereof, and wherein said bolt has a large button-type head with a number or letter indicated thereon and wherein said position indicating means comprise an alphanumeric button on each of said body members and on said head of said bolt, each of said alphanumeric buttons and said head indicating a different number or letter and said numbers or letters being in numerical or alphabetic sequence when said body members and top member are in their proper positions.

10. A toy for young children, said toy comprising
a rod-like support member and a base for maintaining said support member in substantially vertical position, said support member having an axis, guide means extending along said length and a free top end at its farthest distance from said base;
a plurality of body members each having an axial bore formed therethrough whereby each of said body members is removably slidably mounted on said support member and each having directing means for cooperating with said guide means in a manner whereby each of said body members rotates about the axis of said support member in a first direction of rotation when it slides on said support member toward said base and in a second direction of rotation, opposite said first direction, when it slides on said support member away from said base thereby providing variable spiral motion of said body members to interest young children playing with said toy; and
a head member having an axial bore formed therein whereby said head member is removably slidably mounted on said support member and having directing means for cooperating with said guide means at said top end of said support member in a manner whereby said head member rotates about the axis of said support member in said first direction of rotation when it slides on said support member toward said base and in said second direction of rotation when it slides on said support member away from said base thereby providing variable spiral motion of said head member to interest young children playing with said toy.

11. A toy as claimed in claim 10, wherein each of said body members is of an irregular generally cylindrical configuration and said body members and said head member form a predetermined configuration when each of said body and head members is in its proper position relative to the others of said members.

12. A toy as claimed in claim 10, further comprising retaining means for releasably retaining said head member in position on said support member and position indicating means on the surface of each of said body members and on said retaining means for indicating the proper position of each of said body and head members relative to the others thereof.

13. A toy as claimed in claim 10, wherein said guide means of said support member comprises a spiral groove formed in the surface thereof and extending along said length of said support member and wherein said directing means of each of said body members and said head member comprises a projection extending substantially radially into the axial bore thereof and extending into said groove when said member is on said support member.

14. A toy as claimed in claim 11, wherein said body members in their proper positions form the body of a doll-like configuration and said head member in its proper position forms the head of said configuration.

15. A toy as claimed in claim 12, wherein said retaining means comprises a substantially radially extending internally threaded anchor bore in said support member at said top end thereof and extending inwardly from the surface of said support member, a retaining bore formed through said head member and aligned with said anchor bore when said head member is in its proper position, and a bolt passing through said retaining bore and threadedly coupling in said anchor bore thereby retaining said head member in position.

16. A toy as claimed in claim 12, wherein said position indicating means comprise a number button on each of said body members, each of said number buttons indicating a different number and said numbers being in numerical sequence when said body members are in their proper positions.

17. A toy as claimed in claim 15, wherein said bolt has a large button-type head with a number thereon and wherein said position indicating means comprise a number button on each of said body members and on said head of said bolt, each of said number buttons and said head indicating a different number and said numbers being in numerical sequence when said body members and head members are in their proper positions.

* * * * *